United States Patent [19]

Schroeder et al.

[11] 4,353,254
[45] Oct. 12, 1982

[54] CONTROL CIRCUIT FOR ELECTRO-STATIC ACCELEROMETER

[75] Inventors: George F. Schroeder, Wayne; Edward A. Demers, Little Falls, both of N.J.

[73] Assignee: The Singer Company, Little Falls, N.J.

[21] Appl. No.: 217,599

[22] Filed: Dec. 18, 1980

[51] Int. Cl.$^3$ ............... G01P 15/125; G01P 15/13
[52] U.S. Cl. .................... 73/517 B; 318/651
[58] Field of Search .................. 73/516 R, 517 B; 318/651, 662

[56] References Cited

U.S. PATENT DOCUMENTS

3,151,486 10/1964 Plummer ................ 73/517 B
3,446,079 5/1969 Hohenstein ................ 73/517 B

Primary Examiner—James J. Gill
Attorney, Agent, or Firm—Morris Liss; Thomas W. Kennedy

[57] ABSTRACT

An electro-static capacitive accelerometer is a square law device and includes two fixed plates and an intermediary movable plate. A control circuit detects unbalances in the accelerometer, due to acceleration, and generates a signal which induces a corresponding electro-static corrective torque on the accelerometer thus forcing it toward a null condition. The signal is proportional to the acceleration. The invention eliminates prior art summing amplifiers in the control circuit for linearizing the torque of the accelerometer.

6 Claims, 6 Drawing Figures

FIG. IIA

CONTROL CIRCUIT FOR ELECTRO-STATIC ACCELEROMETER

FIELD OF THE INVENTION

The present invention relates to accelerometers, and more particularly to a control circuit for an electro-static accelerometer.

BRIEF DESCRIPTION OF THE PRIOR ART

The prior art includes a class of accelerometers known as electro-static accelerometers. Basically, the device has two fixed plates and a hinged movable plate, located between the fixed plates. During acceleration, the net torque from electro-static forces, required to bring the movable plate into a null position, may be proportional to the acceleration experienced by a craft, to which the accelerometer is attached. The control circuitry proposed by the prior art incorporates a number of summing amplifiers in combination with other electrical components for linearizing the torque of the accelerometer, the latter being a square law device. A major disadvantage of the prior art control systems resides with the use of the summing amplifiers which are directly involved with the accuracy of the accelerometer and are a major source of error. Since these amplifiers are DC amplifiers, their bias and linearities over temperature and different environmental conditions directly affect accuracy.

BRIEF DESCRIPTION OF THE INVENTION

The present invention is an improvement over the control circuitry of the prior art used in conjunction with an electro-static accelerometer. The DC summing amplifiers are replaced by a DC reference power supply in combination with circuit components which achieve the same linearization function as the troublesome summing amplifiers. The stability of the DC reference power supply and attendant circuitry employed markedly reduce the errors previously experienced.

The above-mentioned objects and advantages of the present invention will be more clearly understood when considered in conjunction with the accompanying drawings, in which:

BRIEF DESCRIPTION OF THE FIGURES

FIG. 2 is a first embodiment of the present invention directed to an improvement of the prior art circuitry shown in FIG. 1.

FIG. 2A is a second embodiment of the present invention directed to an improvement of the prior art circuitry shown in FIG. 1.

FIG. 2B is a third embodiment of the present invention directed to an improvement of the prior art circuitry shown in FIG. 1.

DETAILED DESCRIPTION OF THE INVENTION

Figure 1:
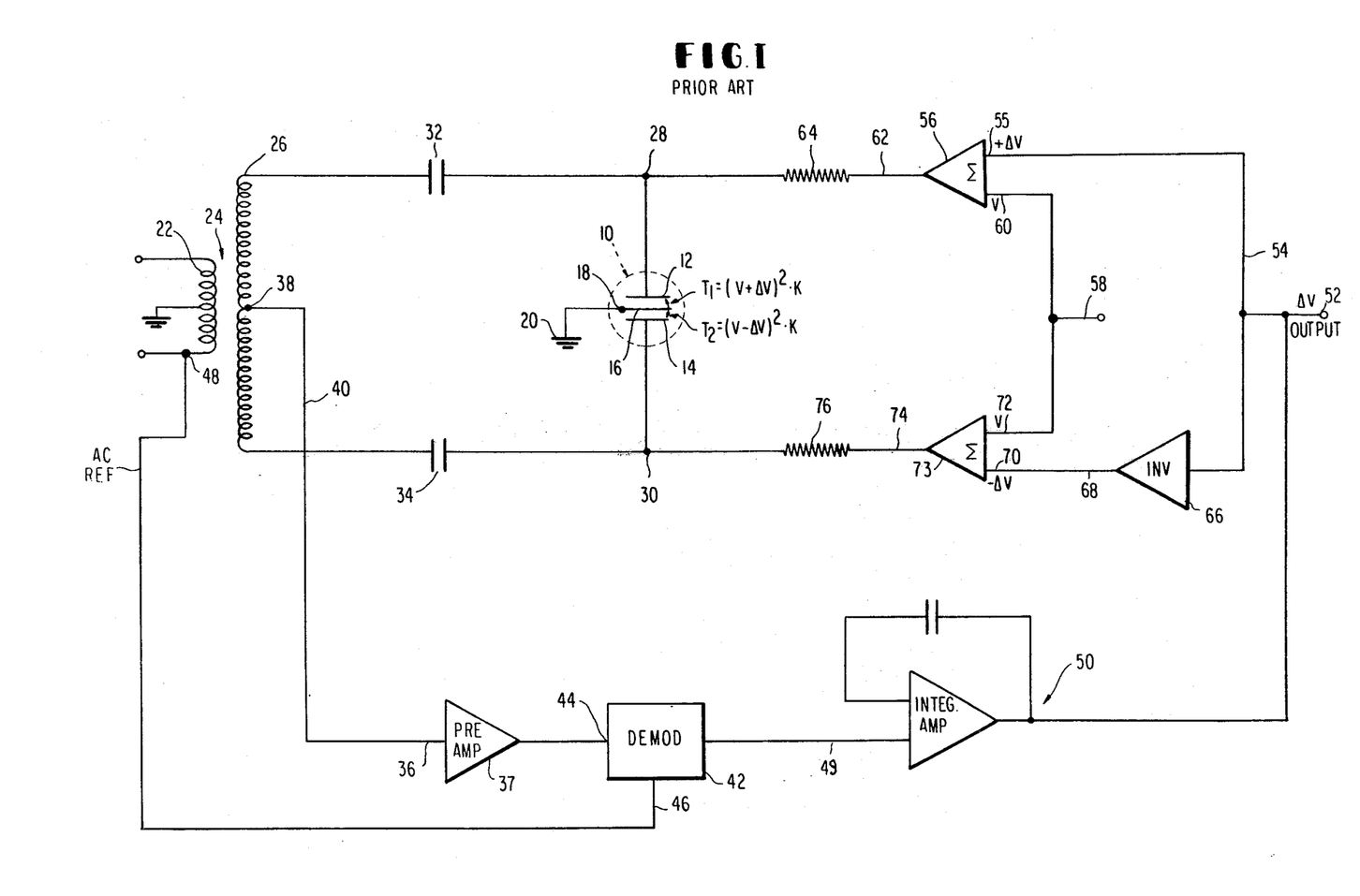
FIG. 1 is a block diagram illustrating a prior art control circuit used in conjunction with an electro-static accelerometer.

Referring to the figures and more particularly FIG. 1, the prior art is seen to include the electro-static accelerometer 10 and associated control circuitry. The electrostatic accelerometer 10 includes two fixed plates 12 and 14, separated by a movable plate 16 which is hinged at point 18. The movable plate 16 may be considered as a pendulum which is electrically grounded at 20. In operation of the device, when the accelerometer is mounted to a missile or craft, the movable plate 16 will normally remain equally spaced from the fixed plates 12, 14. However, in response to acceleration, the movable plate 16 will undergo pivoted displacement toward one or the other fixed plates 12, 14. The purpose of the control circuitry is to generate a signal in the nature of a restoring voltage across the plates 12, 14 which will in turn induce electro-static forces on the movable plate 16 sufficient to restore it to a neutral position. A measurement of the signal renders a proportional measurement of the acceleration being experienced.

The accelerometer 10 is basically a square law device. The control circuitry connected to the accelerometer 10 has as its purpose the linearization of net torque required to restore the movable plate 16 to a neutral position when it is experiencing acceleration. The accelerometer and associated control circuitry shown in FIG. 1 represents the prior art. An AC reference signal is impressed upon the primary winding 22 of transformer 24. The secondary winding 26 is connected across the fixed plates 12, 14 of the accelerometer through blocking capacitors 32 and 34 having respective junction points 28 and 30. A center tap 38 is formed at the secondary winding 26 of transformer 24 which provides a point for connecting lead 40 to the input 36 of preamplifier 37. An AC bridge path is thus created between fixed plate 12, capacitor 32, and the upper portion of transformer secondary winding 26. The second bridge path exists between fixed plate 14, capacitor 34 and the lower portion of the secondary winding 26. Imbalances in the capacitance between the fixed plates 12, 14 and the movable plate 18, such as will occur during acceleration, manifests an AC signal at the input of preamplifier 37. A demodulator 42 is connected at a first input 44 to the output of the preamplifier 37 while a second input 46 to the demodulator is connected to the lower terminal 48 of the transformer primary winding 22. The demodulator 42 is a conventional phase sensitive demodulator which generates a positive or negative DC signal proportional to the amplitude and phase of the AC signal, relative to the AC reference. The DC signal is fed, along lead 49, to an integrating amplifier 50 which generates a signal Δv which may be measured at output terminal 52. The remainder of the control circuitry is intended to feed back Δv to the accelerometer fixed plates 12 and 14 in a generally servo-loop configuration to the extent necessary to restore the unbalanced accelerometer 10 to a neutral position. This means that electro-static forces from the voltages appearing at plates 12 and 14 must be sufficient to accomplish this restoration of the accelerometer. The value of Δv will be made linearly proportional to a restoring torque necessary to achieve the restoration of the accelerometer to a neutral position. When Δv equals zero, the accelerometer experiences no acceleration.

The feedback loop includes lead 54 connecting the output terminal 52 to a first input 55 of summing amplifier 56. This lead similarly provides a signal along lead 68 to the first input 70 of a summing amplifier 73, via inverter 66. A reference DC voltage is provided to the circuitry at input terminal 58. This reference DC voltage (V) is simultaneously fed to the second inputs 60 and 72 of amplifiers 56 and 73. The outputs from the amplifiers 56 and 73 appear along respective leads 62 and 74 which connect the signals $(V+\Delta v)$ and $(V-\Delta v)$ across the respective fixed plates 12 and 14. Isolation resistors 64 and 76 are respectively connected between the fixed plates 12, 14 and summing amplifiers 56, 73. These resistors isolate the bridge components from unwanted impedance factors generated by those components appearing to the right of accelerometer 10. Also, the resistors 64 and 76 isolate the bridge from stray capacitance.

FIG. 1 illustrates, at the accelerometer 10, the torque expressions for $T_1$ and $T_2$ which are respectively the upward and downward torques on the movable plate 16 experienced by this plate as a result of electro-static forces induced during acceleration. The net torque $(T_N)$ may be approximately expressed as:

$$T_N \text{ is equal to } T_1 - T_2 = 4k\,\Delta v V.$$

Thus, it will be appreciated that the control circuitry to which the accelerometer 10 is connected linearizes the net torque on the movable plate 16 as a function of $\Delta v$.

Although the control circuitry shown in FIG. 1 often operates satisfactorily, it has been found that the amplifiers 56, 73 and the inverter 66 may diminish the accuracy of the circuitry and are a major source of error. This is due to the fact that these are DC components of the amplifier variety, and their bias and linearities over temperature and other environmental conditions directly affect accuracy.

FIG. 2 illustrates an improvement to the control circuitry just explained in connection with FIG. 1. As will be observed, the amplifiers 56, 73 and inverter 66 of FIG. 1 have been eliminated. For those components common to both FIGS. 1 and 2, the same reference numerals have been used. In FIG. 2, the feedback path from the output of integrating amplifier 50 includes lead 78, connected in parallel with the output terminal 52 and lead 80. The latter-mentioned lead is connected to junction point 82 between two precision resistors 84 and 86, of equal value. The outward terminals 88 and 90 of the resistors are connected to the accelerometer 10 via isolation resistors 64 and 76. The error signal $\Delta v$ is transmitted from the integrating amplifier 50 to the accelerometer 10 via the precision resistors 84 and 86.

The reference voltage is introduced by a DC reference power supply 92, which generates a stable DC reference equal to 2 V. The power supply 92 is of a standard type which includes an AC-DC conversion capability. A voltage source for the power supply 92 is provided at DC voltage terminals 96, connected to a power inverter 94 which is then connected to an isolation transformer including primary winding 98 and secondary winding 100. In the final layout of the circuitry illustrated in FIG. 2, stray capacitances that can unbalance the bridge comprising capacitors 32, 34 and upper and lower portions of secondary winding 26 must be made small and residual signals very stable.

The torque expressions $T_1$ and $T_2$ are shown at the accelerometer in FIG. 2. The approximate net torque $T_1-T_2$ will be the same as previously expressed in connection with the prior art shown in FIG. 1, namely $T_N = 4k\,\Delta v V$. By eliminating the amplifiers 56, 73 and inverter 66 of FIG. 1, the present invention, as shown in FIG. 2, eliminates the disadvantages causing lower accuracy and increased errors previously mentioned.

FIG. 2A illustrates a second embodiment of the invention which is substantially based upon the embodiment shown in FIG. 2. Accordingly, identical components are referred to by identical reference numerals. However, a simplification of the circuitry of FIG. 2 is achieved by the circuitry of FIG. 2A. The resistors 84 and 86 are deleted while the signal $\Delta v$ is connected directly to the accelerometer point 18 along lead 106. This point is connected in parallel to capacitor 108 which provides an AC ground to the bridge circuit including the accelerometer 10.

A further change is the inclusion of a power supply 114 which provides $(+)\,V$ potential to fixed plate 12, via resistor 64. A $(-)\,V$ potential is provided to the fixed plate 14, via resistor 76. The reference transformer is grounded at the center tap of primary winding 100.

The embodiment of FIG. 2A achieves the summing of $\Delta v$ and the reference voltages $(+)\,V$ and $(-)\,V$ in the accelerometer 10, itself. The sign of the summations is altered, but the net effect is the same. As a result, the precision resistors 84 and 86 of the embodiment shown in FIG. 2 are eliminated. The grounding of transformer primary 100 (FIG. 2A) represents a significant improvement over the embodiment of FIG. 2 inasmuch as it permits the power supply to be grounded and precision resistors 84 and 86 to be eliminated. This allows the use of a single power supply for several accelerometers, when needed. As a result, there is a reduction in the fabrication cost of the circuit by eliminating the precision resistors and there is added flexibility in the event several accelerometers are to be used.

A third embodiment of the invention is illustrated in FIG. 2B. The differences in this embodiment include the grounding of center tap 38 of transformer 24. The signal present at point 18 of accelerometer 10 is provided to the input 36 of preamplifier 37, through capacitor 112. As in the embodiment previously discussed in connection with FIG. 2A, the $\Delta v$ signal is transmitted to movable plate 16, at point 18, but in this embodiment the signal is transferred through a resistor 122. As in the previous instance, the power supply 114 is grounded. Thus, the advantages mentioned in connection with FIG. 2A are available in this embodiment.

Figure 3:
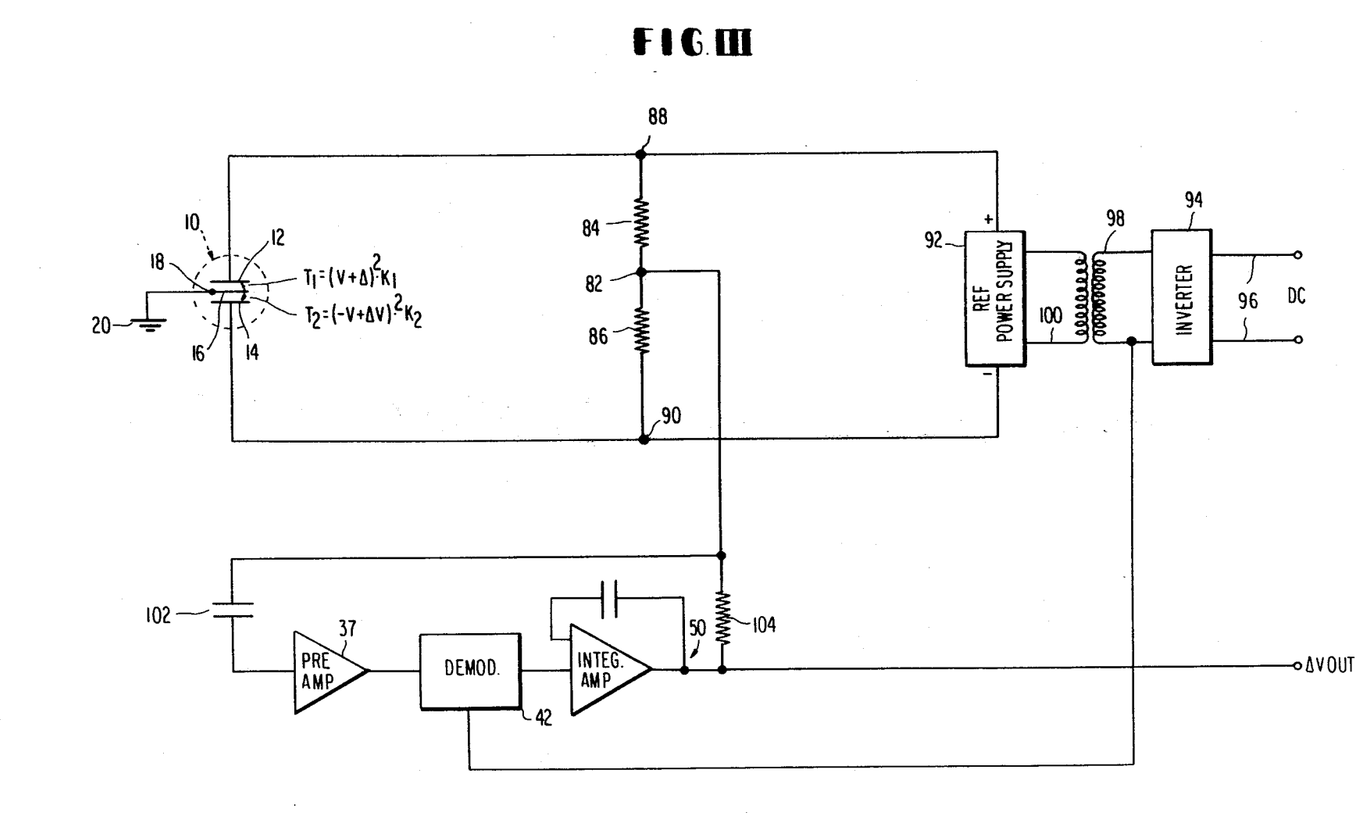
FIG. 3 is a fourth embodiment of the present invention directed to an improvement of the prior art circuitry shown in FIG. 1.

FIG. 3 illustrates the fourth embodiment of the invention. The alternate embodiment includes a variation of the control circuitry, which eliminates components previously explained in connection with FIG. 2, namely, resistors 64, 76, capacitors 32, 34 and the transformer 24. Thus, as will be appreciated, this embodiment permits more economical manufacture than the first embodiment or the prior art. In this embodiment, the ripple output of the reference power supply 92 is used as an AC reference for the bridge circuit comprising the accelerometer 10 and resistors 84 and 86.

A resulting AC signal, proportional to the capacitances between the moving plate 16 and each of the fixed plates 12, 14 of accelerometer 10 will be tapped at junction point 82 then fed to preamplifier 37, via DC blocking capacitor 102. The demodulator 42 has a first input connected to the winding 98 to furnish an AC reference and a second input is connected to the output of preamplifier 37. The AC signal from point 82 will undergo demodulation in demodulator 42 and integration by integrating amplifier 50 which forms a DC output error signal Δv which is equivalent to the output of the circuits of FIGS. 1 and 2.

The DC error signal Δv is fed back, via resistor 104, to the junction 82 between resistors 84 and 86. As a result, the reference voltage and error signal Δv will be impressed upon the fixed plates 12, 14 of accelerometer 10 so that electro-static forces will result causing oppositely directed torques T₁ and T₂ as indicated in the figure. The approximate net torque may be expressed as previously stated, namely, $T_N = 4k \Delta vV$. In each embodiment, the output terminal carrying Δv may be connected to a computer (not shown) to calculate acceleration.

Figure 3A:
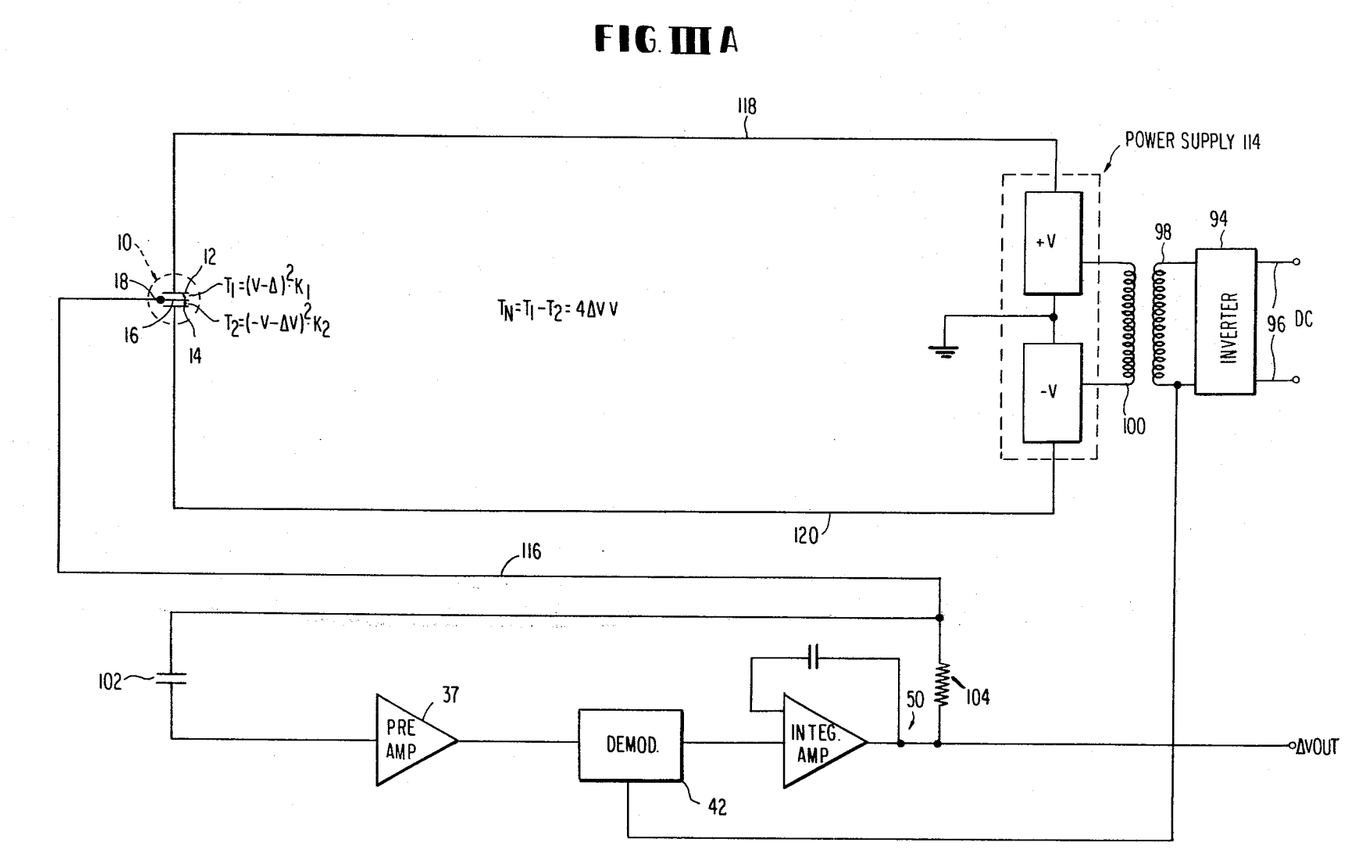
FIG. 3A is a fifth embodiment of the present invention directed to an improvement of the prior art circuitry shown in FIG. 1.

FIG. 3A illustrates a fifth embodiment of the invention. As in the instances of the embodiments shown in FIGS. 2A and 2B, the Δv signal is fed, along lead 116, to the movable plate 16 at point 18. As in FIGS. 2A and 2B, the resistors 84 and 86 are eliminated. The upper lead 118 of accelerometer 10 carries a signal including a DC component plus ripple, while the lower lead 120 carries a negative DC component minus ripple. Also, as in the previous embodiments, the power supply 114 is grounded.

It should be noted that, although the cost of fabrication of the circuit in FIG. 3 is advantageous, the design is less flexible than the embodiment of FIG. 2. The AC feedback path via capacitor 102 and integrating amplifier 50 may limit the feedback characteristics inasmuch as filters of conventional design may have to be employed to suppress oscillations around this feedback path.

In each of the embodiments shown in FIGS. 2, 2A, 2B, 3 and 3A, a scale changing network may be employed as an optional feature but which is not shown. In electro-static accelerometers, a known problem is the sensitivity of the bias to small mechanical imperfections. These sensitivities increase with increases in the reference DC voltage. It is therefore desirable to keep the reference voltage low. By adding a scale changing network, it is possible to keep the reference voltage low during normal operation. The network for scale changing may include a threshold detecting circuit of common design which generates a discrete signal whenever its input exceeds a preset threshold. When the signal is received by the reference power voltage supply, the supply can be designed to change to a different value, thus changing the accelerometer scale factor.

It should be understood that the invention is not limited to the exact details of construction shown and described herein for obvious modifications will occur to persons skilled in the art.

We claim:

1. A control circuit for an electro-static capacitive accelerometer which includes two fixed plates and a movable intermediary plate, the circuits comprising:
a reference source of DC power;
a plurality of interconnected resistive means connected at their outer terminals across the output of the power source for generating DC voltages thereacross;
phase sensitive demodulator means having a first input connected to a reference AC voltage source and a second input connected in circuit with the accelerometer to detect capacitive imbalances thereof;
integrating means connected to the output of the demodulator means for generating a signal corresponding to the integral of the capacitive imbalance;
feedback means connecting the integral signal to a junction between the resistive means;
means connecting the fixed plates of the accelerometer to outer terminals of the resistive means;
terminal means connected to the output of the integrating means for permitting measurement of the integral signal;
wherein the reference AC voltage is derived from a terminal of a transformer, a secondary winding of the transformer being connected in circuit with fixed plates of the accelerometer, and further wherein means are connected between a center tap of the secondary winding and the second input of the phase sensitive demodulator; and
wherein a resistor is connected at a first terminal thereof to the output of the integrating means and at a second terminal thereof to both the resistive means junction and the second input of the demodulator means.

2. The subject matter of claim 1 wherein the plurality of interconnected resistive means includes a pair of precision resistors of equal resistance connected together at the junction.

3. A control circuit for an electro-static capacitive accelerometer which includes two fixed plates and an intermediary movable plate, the circuit comprising:
a reference source of DC power;
a pair of resistors of substantially equal resistance connected together at a junction, the outward terminals of the resistors connected across the power source;
a transformer having a reference AC signal at the primary winding thereof;
the secondary winding of the transformer connected across the accelerometer via respective DC blocking capacitors;
means connecting outward terminals of the resistors across the accelerometer;
a phase sensitive demodulator having a first input thereof connected to the transformer primary and a second input thereof connected to a center tap of the secondary winding for detecting capacitive imbalances;
means connected at the output of the phase sensitive demodulator for integrating output signals corresponding to a signal associated with the integral of capacitive imbalance;
feedback means connecting the integral signal to the junction between resistors;
a terminal connected to the output of the integrating means for permitting measurement of the integral signals;
a preamplifier connected between the center tap and the input of the demodulator;
together with inverter means inductively coupled to the reference source of DC power for providing DC isolation at the input of the reference source.

4. A control circuit for an electro-static capacitive accelerometer which includes two fixed plates and an intermediary movable plate, the circuit comprising:
a reference source of DC power;
inverter means inductively coupled to the reference source for providing DC isolation at the input of the source;
a pair of resistors of substantially equal resistance connected together at a junction, the outward terminals of the resistors connected across the power supply;
means connecting the outward resistor terminals in parallel with the fixed accelerometer plate;
a phase sensitive demodulator having a first input thereof connected in circuit with the junction and a second input thereof connected to the inverter means, the demodulator detecting capacitive imbalance in the accelerometer;

means connected at the output of the phase sensitive demodulator for integrating output signals corresponding to a signal associated with capacitive imbalances;

a feedback resistor connected between the output of the integrating means and the junction; and a terminal connected to the output of the integrating means for allowing measurement of the integral signal.

5. The subject matter set forth in claim 4 together with a preamplifier connected between the center tap and the input of the demodulator.

6. A control signal for an electro-static capacitive accelerometer which includes two fixed plates and a movable intermediary plate, the circuits comprising:

a reference source of DC power;

means connected at the inputs thereof to the source for generating positive and negative potentials at outputs thereof;

phase sensitive demodulator means having a first input connected to a reference AC voltage source and a second input connected in circuit with the accelerometer to detect capacitive imbalances thereof;

integrating means connected to the output of the demodulator means for generating a signal corresponding to the integral of the capacitive imbalance;

feedback means connecting the integral signal to the movable plate;

means connecting the fixed plates of the accelerometer to corresponding positive and negative potentials; and terminal means connected to the output of the integrating means for permitting measurement of the integral signal;

wherein the reference AC voltage is derived from a terminal of a transformer, a secondary winding of the transformer being connected in circuit with fixed plates of the accelerometer.

* * * * *